L. R. DAVIS.
TRUCK TIRE.
APPLICATION FILED MAR. 3, 1921.
1,381,108.
Patented June 14, 1921.
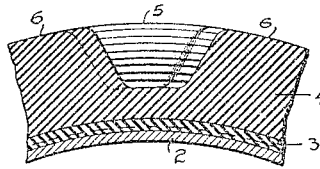
Fig. 2.
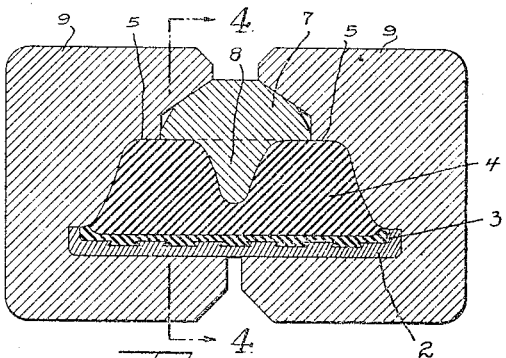
Fig. 3.
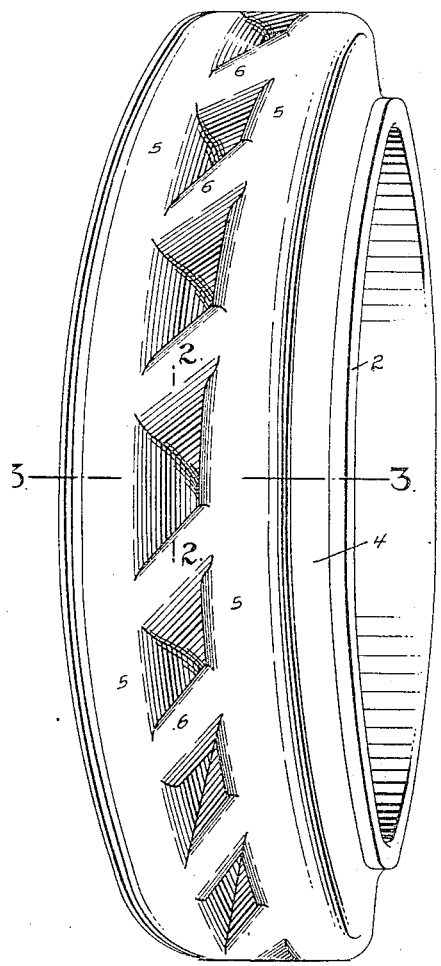
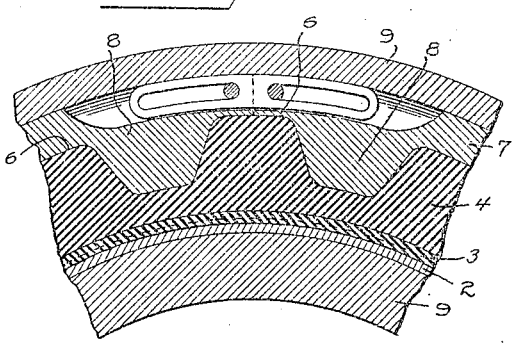
Fig. 4.
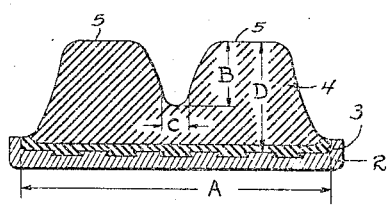
Fig. 5.
Fig. 1.
Inventor
Laurence R. Davis
By his Attorney
Ernest Hopkinson

UNITED STATES PATENT OFFICE.

LAURENCE R. DAVIS, OF PROVIDENCE, RHODE ISLAND, ASSIGNOR TO REVERE RUBBER COMPANY, A CORPORATION OF RHODE ISLAND.

TRUCK-TIRE.

1,381,108. Specification of Letters Patent. Patented June 14, 1921.

Substitute for application Serial No. 381,633, filed May 15, 1920. This application filed March 3, 1921. Serial No. 449,392.

*To all whom it may concern:*

Be it known that I, LAURENCE R. DAVIS, a citizen of the United States, residing at Providence, in the county of Providence and State of Rhode Island, have invented certain new and useful Improvements in Truck-Tires, of which the following is a full, clear, and exact description.

This invention relates to an improvement in truck tires, and is a substitute for my application Sr. No. 381,633, filed May 15, 1920. Solid truck tires as heretofore made, deteriorate more rapidly than is desirable as a result of the internal friction set up by a traction wave which forms ahead of the rolling point of contact with the ground. Heat is consequently produced that is not radiated and dissipated efficaciously. Usually these large size solids did not afford good traction. And they could not be vulcanized with desirable uniformity throughout their mass, the heart of the tire being cured only partially.

The present invention has to do with large sized solids. It aims primarily to eliminate the major source of internal friction and consequent deleterious heating, to permit more perfect or uniform vulcanization, to more effectively provide for radiation and dissipation of whatever heat may be developed in service, and to provide in addition good traction.

The tire embodying the invention has its tread portion provided with a series of cavities of a depth sufficient to insure substantially uniform vulcanization of its entire mass of rubber, the heart as well as the margins. The cavities are of a cross-section, or rather volume, sufficient to break up the traction wave that occurs at the center of the tire, where in previous large solid tires the consequent heating from internal friction has been most injurious. The contradictory requirements of uniform vulcanization and load carrying capacity, the former demanding more and the latter less cavities, have been met by proportioning the mass of rubber left between cavities (and constituting cross bars) to substantially equal in volume the cavities. The cross bars serve not only to supplement the load carrying capacities of the flanking tread portions, but also to dissipate by radiation heat that may be generated in the same and to provide good road grip.

The invention is illustrated in the accompanying drawing, in which:

Figure 1 is a perspective view of one form of my improved tire.

Fig. 2 is a detailed sectional view of the tire on the line 2—2 of Fig. 1;

Fig. 3 is also a sectional view on the line 3—3 showing the mold in section, and Fig. 4 is an irregular fragmental section on the line 4—4 through the mold and the tire within the mold; and Fig. 5 is a diagrammatic cross-section.

In the drawings, the reference character 2 designates a metallic rim or base to which the rubber portion is vulcanized; the rubber portion comprises a band of relatively hard rubber 3 which is vulcanized to the rim 2 and the body 4 of soft rubber. The band 3, while desirable, is not essential, however, to the present invention as the tire may be vulcanized to the rim 2 in any desired manner. Formed integrally with the body or base 4 are twin tire members 5, which in the form shown in the drawings are connected to each other by cross bars 6 which extend at an angle preferably but not necessarily at 45° to the axis of the tire as shown at the vertical center of Fig. 1. As can be seen from the drawings, the adjacent inner side walls of the twin tires, and the opposed side walls of adjacent cross bars converge from the tread surface of the tire toward the base while the cavities defined by the cross bars and the twin tires are relatively deep when compared to the total thickness or depth of the tire structure.

The size of the cavities may, of course, be advantageously varied with the width of the tire. The average depth of the cavities indicated at B, Fig. 5, may be from 1/2 to 7/10 the total thickness indicated by D. And the width of the bottoms of the cavities as indicated at C may be from 7/100 to 11/100 of the total width of the tire which is indicated at A. These proportions yield the best results, but may be varied slightly, but not with advantage. In a tire 14″ wide, the depth of the cavities must be at least 1/2 the total thickness. In length, the cavities will vary, of course, with the number employed. From 15 to 20 are preferred. In any case, however, the length of the cavities is such that they have a volume substantially equal to the volume of the cross bars.

The rubber stock is built up on the rim or base 2 in the usual manner, and a sectional mold ring 7 having deep projections 8 extending radially therefrom is then placed about the tire, and the sections are drawn toward each other and held and clamped in position by the mold members 9, as clearly shown in Figs. 3 and 4. The mold is then placed in the usual vulcanizing press to hold the mold parts in position and to cure the rubber, and as the projections 8 on the mold ring 7 extend a considerable distance into the body of the structure to form the twin tires, these projections which are of relatively large cross-sectional area will radiate heat from the center of the tire structure toward the edges thereof or from the inner surfaces of the twin tires toward their outer surfaces. At the same time, the members 9 of the mold structure will conduct heat to the edges of the tire, so that the twin tires together with the cross bars will be thoroughly and substantially uniformly cured without overcuring the surfaces in contact with the mold parts.

It will be seen from the drawings that the cavities are arranged in a row circumferentially around the center of the tread surface of the tire, and that they divide it into substantially independent portions which in service will operate or have the action of two independent single tires, known as duals. The number of cavities may, of course, be varied and likewise also their size and shape. The drawings illustrate the preferred number of cavities and their preferred size and shape. As shown, the volume of the cavities is substantially equal to the volume of the cross bars, that is to say, there is about as much rubber in the cross bars as it would take to fill the cavities. The cross bars, however, could be increased or decreased slightly in size if more or less load carrying capacity should be desired.

A tire made as above described in detail combines the durability of duals in a single type that may be vulcanized in a mold in one operation. It approximates the action of duals with augmented load bearing service furnished by the cross bars. It cuts out the heart of the traction wave that attends the use of large types of singles, either plain or provided with annular grooves in their treads. It has a good traction grip throughout its life and in its preferred form runs very smoothly, the cross bars of the preferred construction being inclined to progressively engage the road bed. It may be vulcanized with more perfect uniformity than previous large single tires. In short, it is the desideratum in solid singles combining load carrying capacity, low heating from internal friction, and smooth running but good traction. All these characteristics are obtained in a single type of tire that may be cured in a mold in one operation and cured substantially uniformly.

Further, advantages result from the provision of a tire having deep flaring cavities between the twin tires and the cross bars, which will not clog with mud, stones, etc. It may be worn out without losing its qualities, the bottom of the cavities being at or below its limit of serviceability. Due to the configuration of its body, the tread surface increases as the tire wears away in such proportion that the load carrying capacity is uniform throughout its life.

The foregoing relates to the invention in its preferred form. It will be understood that various changes may be made without departing from the underlying principles of the invention, which as now comprehended are the elimination of the heart of the traction wave and consequently the source of a large part of the injurious internal friction developed heretofore, in single tires for heavy service, and also at the same time attaining a tire shape that permits substantially uniform vulcanization in one operation and affords good traction. The treads of the flanking twin portions are preferably plain, but may be given any suitable superficial design.

Having thus described my invention, what I claim and desire to protect by Letters Patent is:

1. A solid tire for heavy load carrying vehicles much wider than deep in cross section, having outer side walls converging toward its tread and provided centrally only with a row of cavities of a depth and volume sufficient to divide it into substantially independent tire portions, to substantially eliminate internal friction and heat generation from the center of the tire, to permit uniform curing in one operation and to afford a tread surface having good traction and extensive bearing surface.

2. A solid tire for heavy load carrying vehicles much wider than deep and approximately trapezoidal in cross section its side walls converging toward the tread, having a substantially flat tread surface provided centrally only with a row of cavities and cross bars of substantially equal volume respectively, said cavities being of a depth not less than one-half of the total thickness of the tire and of a volume sufficient to permit of uniform vulcanization whereby the action of duals is preserved in a single type of tire without injurious heating at the center, the load carrying capacity of duals is exceeded, traction provided, and heat dissipated.

3. A solid tire for heavy load carrying vehicles broader at the base of its cushioning mass than at the tread and much wider than deep having a substantially flat tread surface provided centrally only with a row of cavities of a depth and volume permitting substantially uniform vulcanization, and having transversely inclined cross bars between the cavities affording a smooth running traction grip on the roadway as well as radiating surfaces for heat generated in service, said cross bars also augmenting the load carrying capacities of the portions of the tire flanking the row of cavities.

Signed at New York this 28th day of Feb., 1921.

LAURENCE R. DAVIS.